United States Patent [19]
Moran

[11] 3,711,206
[45] Jan. 16, 1973

[54] OPTICAL ANALYZING MEANS FOR AUTOMATIC CHEMICAL TESTING APPARATUS

[75] Inventor: John Joseph Moran, Houston, Tex.
[73] Assignee: Hycel, Inc., Houston, Tex.
[22] Filed: Jan. 19, 1971
[21] Appl. No.: 107,737

[52] U.S. Cl. ................356/201, 356/205, 356/246
[51] Int. Cl. ....................G01n 21/06, G01n 21/22
[58] Field of Search......356/201, 208, 246, 181, 184, 356/186, 180, 44, 88, 204, 205, 206; 350/96 B; 250/217 F, 227

[56] References Cited

UNITED STATES PATENTS

| | | | |
|---|---|---|---|
| 3,241,432 | 3/1966 | Skeggs et al. | 356/181 X |
| 3,512,163 | 5/1970 | Pelavin | 356/181 X |
| 3,142,719 | 7/1964 | Farr | 356/201 |
| 3,246,559 | 4/1966 | Clifford, Jr. | 356/246 |
| 3,478,598 | 11/1969 | Nielsen | 356/246 X |
| 3,354,319 | 11/1967 | Loewer et al. | 350/96 B X |
| 3,418,053 | 12/1968 | Pelavin | 356/246 X |
| 3,413,481 | 11/1968 | Berry | 356/186 X |
| 3,506,366 | 4/1970 | Hrdina | 356/246 |
| 3,508,837 | 4/1970 | Hrdina | 356/246 |
| 3,518,015 | 6/1970 | Hrdina | 356/246 |
| 3,327,712 | 6/1967 | Kaufman et al. | 350/96 B |
| 3,335,287 | 8/1967 | Hargens | 250/227 |
| 3,440,866 | 4/1969 | Ness et al. | 356/181 X |
| 3,489,525 | 1/1970 | Natelson | 356/208 UX |
| 3,562,539 | 2/1971 | Beroza et al. | 250/227 |
| 3,572,994 | 3/1971 | Hochstrasser | 336/181 X |
| 3,582,284 | 6/1971 | Hamshere et al. | 356/208 X |

FOREIGN PATENTS OR APPLICATIONS 166,396   7/1950   Austria ..........................350/96 B

*Primary Examiner*—Ronald L. Wibert
*Assistant Examiner*—Paul K. Goodwin
*Attorney*—James F. Weiler, Jefferson D. Giller, William A. Stout, Paul L. De Verter, II, Dudley R. Dobie, Jr. and Henry W. Hope

[57] ABSTRACT

An optical analyzing means for use with an automatic chemical testing apparatus which is positioned at the readout station including a readout block having a plurality of elongate testing chambers of a predetermined size which are inclined slightly from the horizontal for draining and including a generally vertically passageway connected adjacent the lower portion of the chambers for insertion into the reaction tubes on the testing apparatus for aspirating samples from the tube for testing and expelling the tested contents after optically analyzing the sample. A single light source spaced from the testing chambers whereby the heat of the light source will not adversely affect the contents of the testing chambers and a plurality of fiber optic tubes each of which is connected to the light source and to one of the testing chambers for passing light through the testing chambers for optical analysis. An air manifold connected to each of the testing chambers controlled by valve means between the manifold and the testing chambers for flushing air through the testing chambers for expelling the contents of the testing chambers after the test has been completed.

5 Claims, 7 Drawing Figures

John J. Moran
INVENTOR

ATTORNEYS

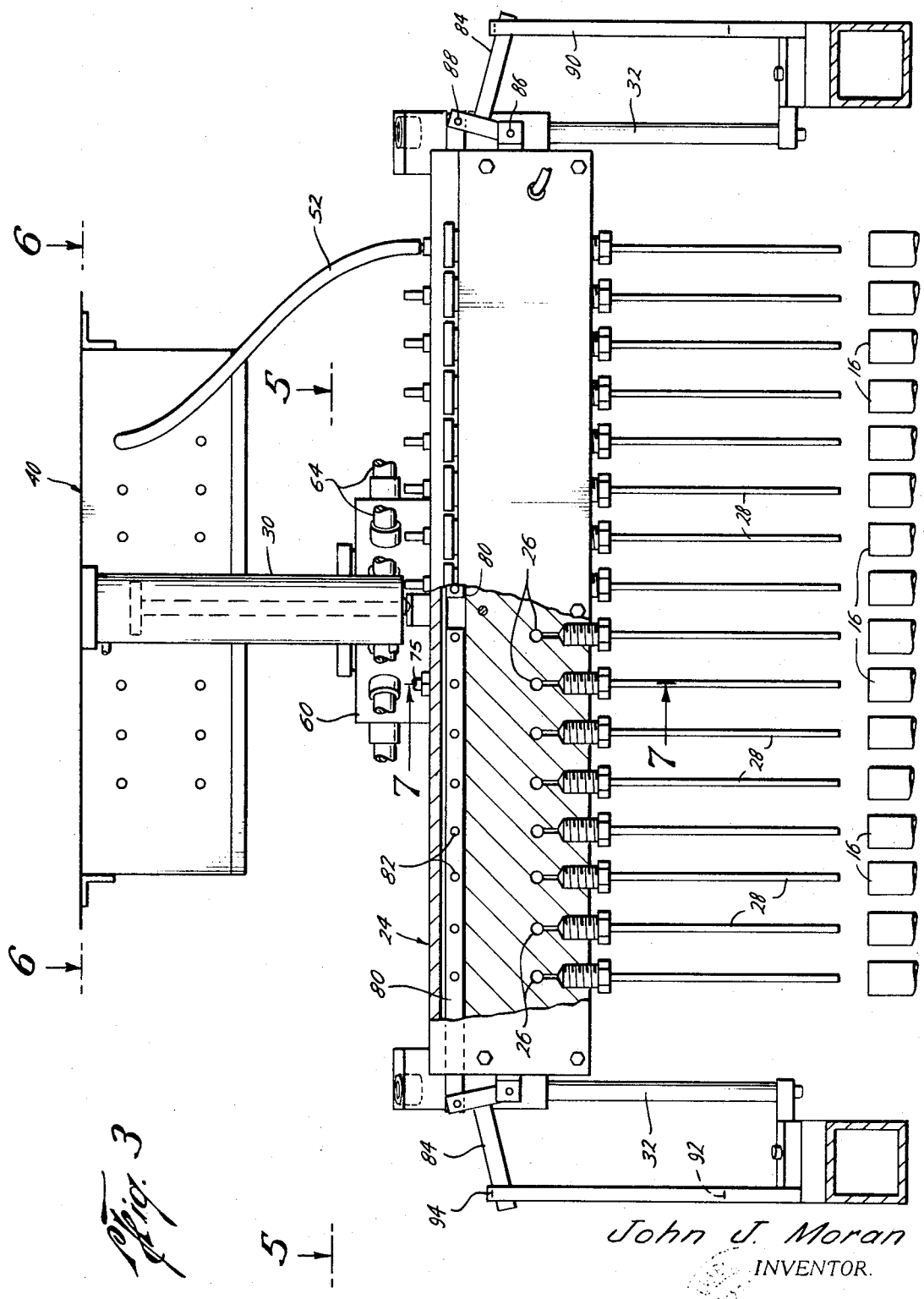

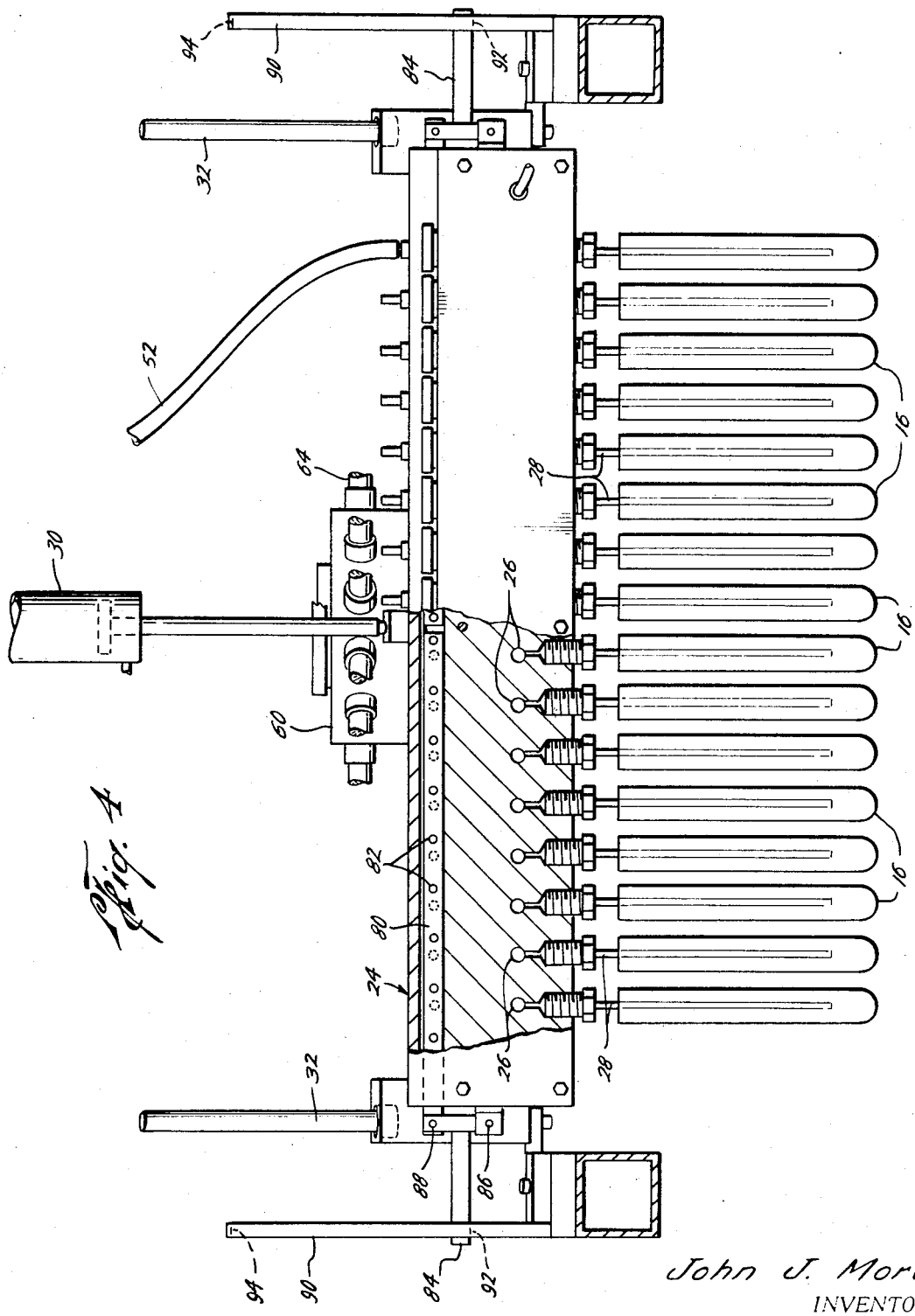

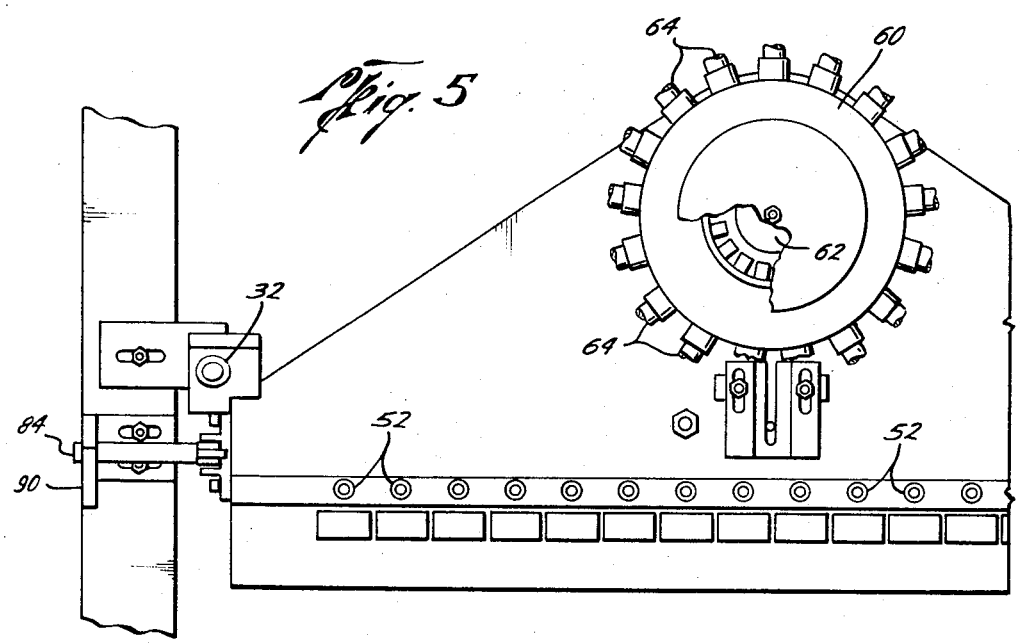
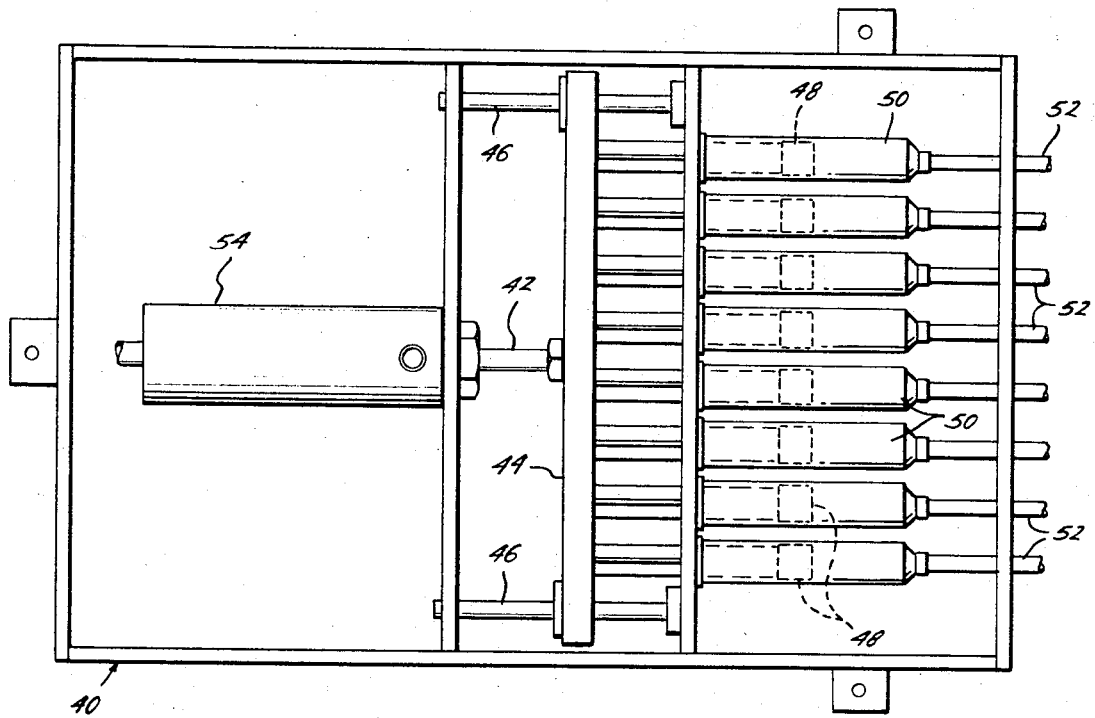

3,711,206

OPTICAL ANALYZING MEANS FOR AUTOMATIC CHEMICAL TESTING APPARATUS

BACKGROUND OF THE INVENTION

The use of an optical readout system for optically analyzing the contents of reaction tubes in an automatic chemical testing apparatus is generally shown in my co-pending patent application Ser. No. 737,065, filed June 14, 1968, now U.S. Pat. No. 3,622,279 entitled Automatic Chemical Testing Apparatus.

The present invention is generally directed to various improvements in an optical analyzing or readout means for use with an automatic chemical testing apparatus such as providing a fiber optic system connected to a single light source remote from the testing chambers thereby avoiding heat problems created by the use of a plurality of exciter lamps, providing testing chambers which can be accurately sized to insure that the light path through the tested sample is the optimum, and providing an improved system for expelling the tested samples from the testing chambers after the readout has been completed.

SUMMARY

The present invention is directed to various improvements in an optical readout or analyzing system for optically analyzing the contents of treated samples on an automatic chemical testing apparatus.

One feature of the present invention is the provision of a single light source spaced from the testing chambers thereby reducing the amount of heat from the light source which could adversely affect the contents of the testing chamber and providing a plurality of fiber optic lines from the light source to each individual testing chamber for conducting the light through the samples to be tested for optically analyzing the samples.

Yet a further object of the present invention is the provision of a readout block having a plurality of elongate testing chambers which can be accurately machined to provide the proper length of light path through the samples being measured and includes a generally vertical passageway connected to each of the testing chambers for insertion into the reaction tubes on the automatic chemical testing machine for aspirating samples to be tested and expelling the samples after testing in which the testing chambers are inclined slightly from the horizontal and the vertical passageways are connected adjacent the lower portion of the testing chambers to insure complete drainage of the testing chambers after the optical test has been completed.

In addition, the readout block includes a reservoir connected to and extending upwardly from each of the testing chambers for aspirating the contents of the tubes into the testing chambers and insuring that the testing chambers are completely filled at the time of testing.

Still a further object is the provision of an air manifold connected to each of the reservoirs and to an air source with valve means positioned between the manifold and the testing chambers for admitting a high volume of air to insure complete flushing out of the contents of the testing chambers after the optical tests have been completed.

Other and further objects, features and advantages will be apparent from the following description of the presently preferred embodiment of the invention given for the purpose of disclosure and taken in conjunction with the accompanying drawings.

BRIEF DESCRIPTION OF THE DRAWINGS

FIG. 3 is an enlarged fragmentary elevational view, partly in cross section, illustrating the optical analyzing system of the present invention with the readout block positioned in this upward position, FIG. 4 is an enlarged fragmentary view, partly in cross section, similar to FIG. 3 illustrating the readout block in its downward position, FIG. 5 is a fragmentary cross-sectional view taken along the line 5—5 of FIG. 3, FIG. 6 is a cross-sectional view taken along the line 6—6 of FIG. 3.

DESCRIPTION OF THE PREFERRED EMBODIMENT

Figure 1:
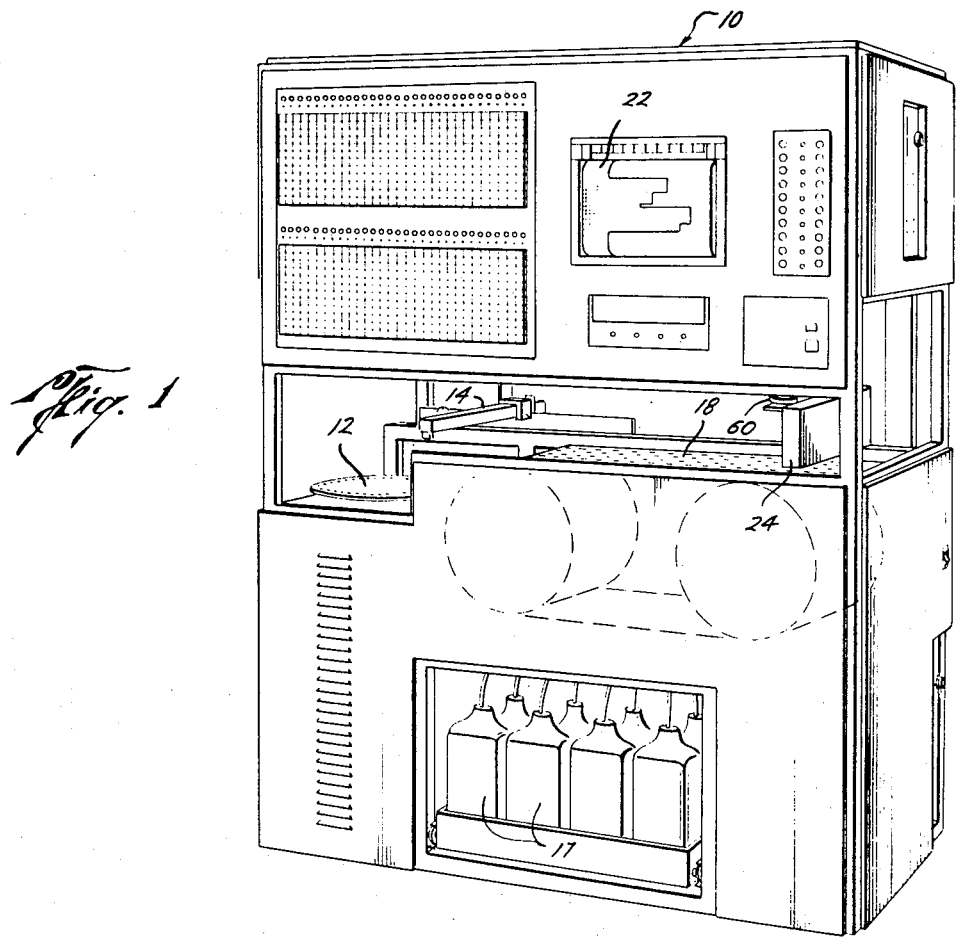
FIG. 1 is a perspective and schematic view of the present invention as used on one type of automatic chemical testing apparatus.
Figure 2:
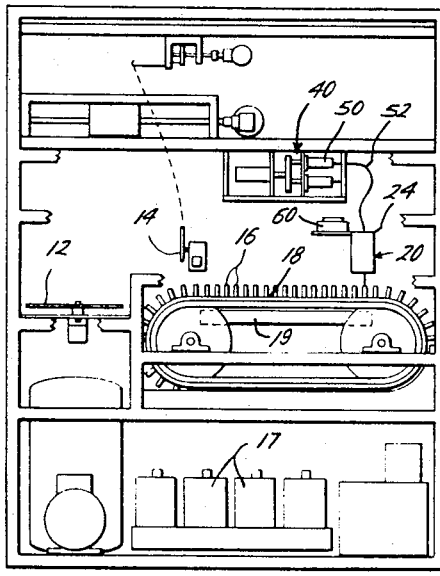
FIG. 2 is a schematic elevational view of the apparatus of FIG. 1.

Referring now to FIGS. 1 and 2, the reference numeral 10 generally indicates an automatic chemical testing apparatus having a sample table 12 on which the samples to be tested are placed and in which the samples on the table 12 are rotated sequentially to a pick up station wherein a pick up and dispensing mechanism 14 picks up the sample and places it into containers 16 on an endless belt 18 for sequentially carrying the samples to the desired testing procedures such as adding reagents from containers 17 thereto, heating by heating means 19 and a testing station 20 which reads out the test results and records the results on a recorder 22.

The above described automatic chemical testing apparatus is more fully described in my co-pending patent application Ser. No. 737,065, filed June 14, 1968 now U.S. Pat. No. 3,622,279. And while the present invention of an improved optical analyzing system will be described in connection with this use on the automatic chemical testing apparatus 10 shown in FIGS. 1 and 2, it will be recognized that the present invention can be used on other types of automatic chemical testing apparatuses.

After the samples have been picked up from the sample table 12 by the sample pick up and dispensing mechanism 14 and placed in the test tubes 16 on the conveyor belt 18, the samples are indexed and reagents from containers 17 are added by conduits (not shown) at the proper stations and heated by means 19, and the tubes 16 are indexed to the readout station 20 at which the results of the test are analyzed.

The optical readout system, as best seen in FIGS. 3–7, includes a readout block or housing 24. The readout block 24 is slidably supported by guides 32 at each end for vertical movement. The readout block 24 includes a plurality of testing chambers 26, one each for each of the longitudinal rows of tubes 16 on the belt 18, and includes a plurality of generally vertical passageways 28 extending downwardly, one of which is connected to each of the testing chambers 26. The readout block 24 is raised and lowered by an air and piston assembly 30 whereby the readout block 24 may be lowered as shown in FIG. 4 to insert the longitudinal passages 28 in the individual reaction tubes 16 for aspirating the treated samples therefrom into the testing chambers 26 whereby a light beam may be passed through the testing chambers 26 and an optical readout measures the amount of light transmitted through the samples in the testing chamber for testing. After testing the piston and cylinder assembly 30 raises the readout block 24, as best seen in FIG. 3, and the tested samples in the testing chambers 26 are expelled therefrom through the passages 28 back into the reaction tubes 16. The conveyor belt 18 may then be indexed and another set of tubes 16 brought to the readout station 20 and analyzed.

Figure 7:
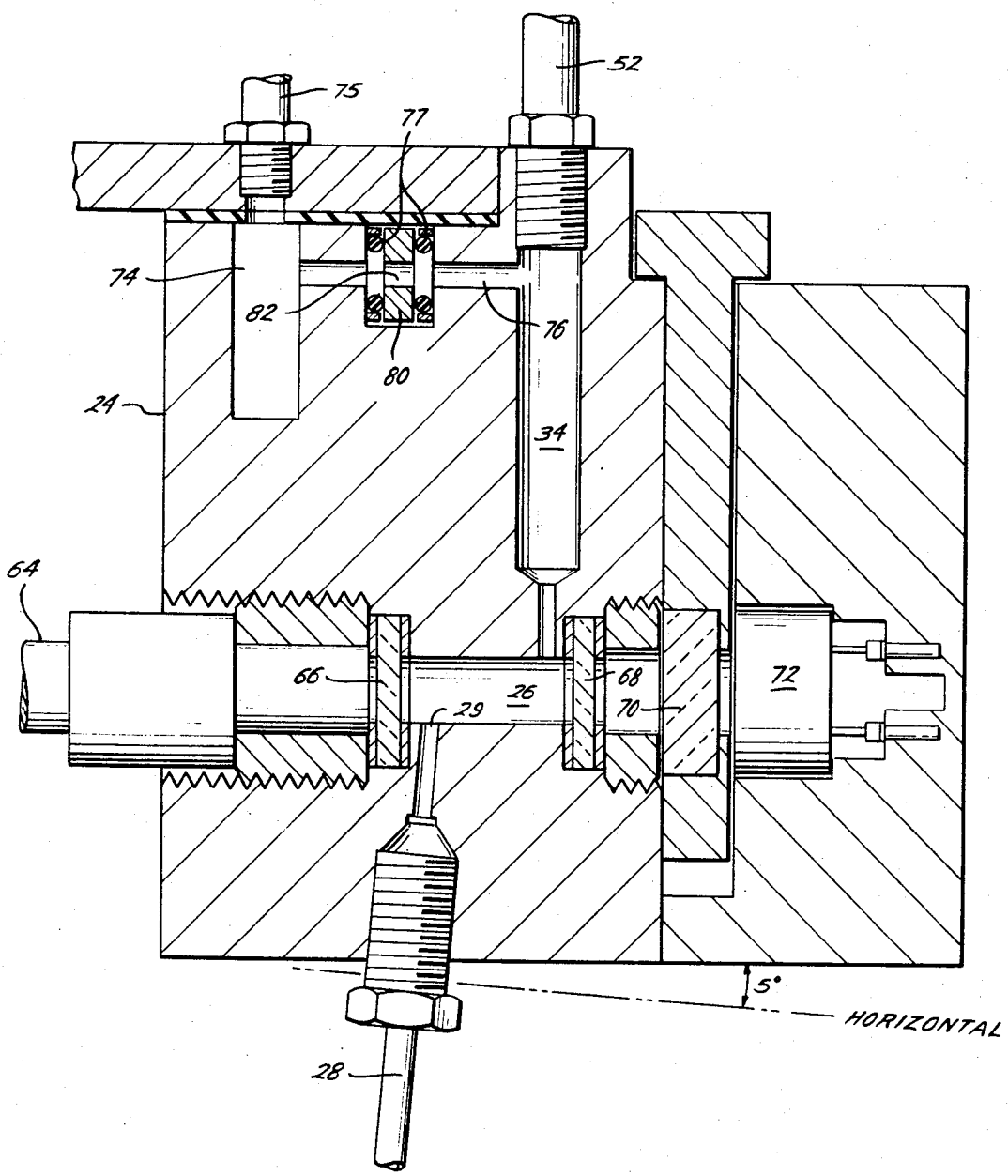
FIG. 7 is an enlarged cross-sectional view taken along the line 7—7 of FIG. 3.

Referring now to FIG. 7, it is to be noted that the length of the testing chambers 26 can be accurately machined to maintain the desired length of light path through the chambers 26, for example 16 mm. Preferably, the readout block 24 is inclined from the horizontal at a small angle, for example 5°, in order that the elongated horizontally positioned testing chambers 26 will also be inclined 5° from the horizontal. Thus, passageways 28, which are connected to the testing chambers 26 at position 29 which is adjacent the low portion of the chambers 26 the tested samples in the chambers 26 may be more readily drained and expelled from the chambers 26 after testing. Preferably, the passageways 28 are vertically positioned in order to be aligned with the vertical axis of the reaction tubes 16 for movement into and out of the tubes 16. The readout block 24 also includes a reservoir 34 connected to each of the testing chambers 26 and extending vertically thereabove whereby when the sample to be tested is drawn through the passageways 28 and into the the testing chambers 26 and into the reservoirs 34. Thus the testing chambers 26 will be completely filled to eliminate any air in the testing chambers 26 which will adversely affect the optical readout.

After the readout block 24 is lowered and inserts the passageways 28 into the test tubes 16, as shown in FIG. 4, a fill and expel air piston and power assembly 40, FIGS. 3 and 6, is connected by piston rod 42 to a movable bar 44 which is supported at each end by slidable rods 46. The movable bar 44 is connected to a plurality of individually arranged syringe pistons 48, one for each testing chamber 26, each of which is slidable in a cylinder 50. A line 52 connects each cylinder to one of the reservoirs 34 leading to each of the testing chambers 26. Thus, on actuation of the fill and expel piston and cylinder assembly 40 on the suction stroke the movable bar 44 and all of the pistons 48 are retracted by a piston and cylinder assembly 54 creating a suction in the lines 52 and in each of the testing chambers 26 to suck up the liquid from the tubes 16 into the testing chambers 26 and into the reservoirs 34 to insure complete filling of the testing chambers 26.

As previously been indicated, external heat from sources such as the light source in an optical readout system may tend to undesirably heat the testing chambers 26 and thereby adversely affect the test samples placed therein and give erroneous readings. One feature of the present invention is the provision of a fiber optic readout system using a single light source to provide the testing light for all of the testing chambers 26 thereby reducing the amount of heat dissipated by the light source. This also allows the light source to be positioned remote from the testing chambers 26 thereby insuring that the heat from the light source will not adversely affect the test samples in the testing chambers 26. Thus, referring to FIGS. 1–5 and 7, a fiber optic source 60 is provided having a light source 62 with a plurality of radially spaced fiber optic tubes 64 the first ends of which are directed toward the light source 62 for receiving light therefrom. The second ends of tubes 64 are aligned with one of the testing chambers 26 to transmit the light from the light source 62 through the testing chambers 26. As best seen in FIG. 7, the light is transmitted through one of the fiber optic tubes 64 through a glass window 66 forming one end of the testing chambers 26 and through a second glass window 68 forming the second end of the testing chamber 26 and through an interference filter 70 and to a light measuring means such as a photoelectric cell 72. Thus, the value of the light intensity measured by the photoelectric cell is the measure of the property of the sample being tested in the testing chamber 26 through which the light is transmitted. The output measurement of the cell 72 is transmitted to the recorder 22 (FIG. 1). It is to be noted that with the use of a single light source 62 and its remoteness from the testing chambers 26 that the testing chambers 26 and readout block need not be supplementally cooled.

After the optical testing has been completed, the readout block 24 is raised by the piston and cylinder assembly 30 to the position shown in FIG. 3 and the fill and expel assembly 40 (FIG. 6) is actuated to extend the pistons 48 in the cylinder 50 to expel the fluid from the reservoirs 34, testing chambers 26 and vertical passageways 28 back into the test tubes 16. Additionally, and referring to FIG. 7, an air manifold 74 is provided which is connected by an inlet 75 to a suitable source of air to provide a greater volume of air for expelling the tested sample from and cleaning the testing chambers 26. The air manifold 74 is in communication with each of the reservoirs 34 through a passageway 76 and which is provided a lever actuator sliding bar valve 80. Bar 80 includes a plurality of ports 82 which may be aligned with the passageways 76 for allowing flushing air from passing from the air manifold 74 to the reservoirs 34 for expelling the tested fluid from the chambers 26. O rings 77 are positioned on each side of the bar 80 and coaxially aligned with the passageways 76 for sealing purposes. Ports 82 are moved out of the passageways 76 to close the passageways 76 when the samples to be tested are being aspirated into the testing chambers 26. Preferably, the sliding bar valve consists of two separate portions 80 at each side of the readout block 24 for opening and closing the ports 82. Sliding bar valves 80 are each actuated by an actuating arm 84 which pivots about a pin 86 and is connected to lever 80 by a pin 88 whereby on actuation of the actuating arm 84 the levers 80 are moved inwardly and outwardly of the readout block 24 to move the ports 82 into and out of alignment with the passageways 76. Actuating arms 84 each move in guide slot in a guide 90 which includes a lower stop 92 and an upper stop 94. As best seen in FIG. 3 when the readout block 24 is in the upper position, the actuating arms 84 have contacted upper stops 94 to pull sliding levers 80 outwardly to move the ports 82 into alignment with passageways 76 so that air from the air manifold 74 may pass through passageways 76 and reservoirs 34 to flush the already tested sample out of the testing chambers 24 through the passageways 28 and back into the reaction tubes 16.

However, as best seen in FIGS. 4 and 5, when the readout block 24 is moved to the downward position, the actuating arms 84 contact the lower stops 92 to move the levers 80 inwardly thereby moving the ports 82 out of alignment with the passageways 76 and thereby preventing air from the air manifold flowing toward the test chambers 26 and preventing any test samples from being drawn up through the reservoirs 34 and into the air manifold 74.

In use, after the samples have been dispensed into the tubes 16 in the automatic chemical testing apparatus 10 and gone through the proper chemical procedures, the test tubes 16 are indexed to the readout station 20 in which the results of the tests can be analyzed. As the readout station, the piston and cylinder assembly 30 lowers the readout block 24 (FIG. 4) to insert the vertical passages 28 into the test tubes 16 and the actuating arms 84 are actuated to move the levers 80 to close off the air manifold supply 74 from the text chambers 26. The fill and expel assembly 40 is actuated to create a suction in lines 52 and through the test chambers 26 to draw up treated samples through the passageways 28 into the test chambers 26. The fiber optic readout 60 is actuated to pass light through the fiber optic tubes 64 to each of the testing chambers 26 to record the measured amount of light transmitted through the treated samples in the testing chamber 26 on the recorder 22. The piston and cylinder assembly 30 is then actuated to raise the readout block 24 to the position shown in FIG. 3. The actuating arms 84 contact stops 94 to move the levers 80 and align the ports 82 with the passages 76 whereby flushing air may flow from the air manifold 74 through the reservoirs 34, testing chambers 26 and vertical passageways 28 to flush the now tested sample back into the tubes 20. The conveyor belt 18 is then indexed and another set of tubes 16 are brought to the readout station where they can be analyzed by the optical readout system of the present invention.

The present invention is, therefore, well adapted to carry out the objects and attain the ends and advantages mentioned as well as others inherent therein.

What is claimed is:

1. In a chemical testing apparatus in which a plurality of reaction tubes are indexed through various positions, test samples and reagents are dispensed into the reaction tubes, and the contents of the tubes are analyzed, the improvement in means for optically testing the contents of the tubes comprising, a readout housing including a plurality of testing chambers of predetermined size, a generally vertical passageway connected to the lower portion of each of the chambers and extending downwardly, a support supporting the readout housing and said passageways, means for moving the housing and the reaction tubes relative to each other for establishing communication of the passageways with the test samples in the tubes, suction means connected to each of the chambers for aspirating the contents of the tubes into the testing chambers when the passageways are in fluid communication with the samples in the tubes, a single light source remotely spaced from the testing chambers whereby the heat of the light source will not adversely affect the contents of the testing chambers, a plurality of fiber optic tubes, each of which is connected to the light source and one of the testing chambers for passing light through each of the testing chambers, and light measuring means for measuring the light passing through each of the testing chambers.

2. The apparatus of claim 1 including, an air manifold connected to the top of each of the testing chambers, and valve means positioned between the manifold and the testing chambers, for admitting air into the testing chambers for expelling the contents of the testing chambers and passageways.

3. The apparatus of claim 2 wherein the valve means includes, a sliding lever having a plurality of ports, an actuating arm connected to the lever, and an upper and lower stop positioned to contact and to move the actuating arm as the readout block is raised and lowered.

4. The apparatus of claim 1 wherein the first ends of the fiber optic tubes are radially positioned around the light source and axially aligned therewith, and each second end of the fiber optic tubes is coaxially aligned with one of the testing chambers.

5. In a chemical testing apparatus in which a plurality of reaction tubes are indexed through various positions, test samples and reagents are dispensed into the reaction tubes, and the contents of the tubes are analyzed, the improvement in means for optically testing the contents of the tubes comprising, a readout housing including a plurality of testing chambers of predetermined size, a plurality of generally vertical passageway each of which is connected adjacent the lowest portion of one of said chambers and extending downwardly for insertion into one of the tubes, a movable support supporting the readout housing and said passageways, means for moving the housing and for moving the passageways into said tubes and retracting said passageways from the tubes, suction means connected to each of the chambers for aspirating the contents of the tubes into the testing chambers when the passageways are inserted into the tubes, an air pressure manifold connected to the tops of each of the chambers for admitting air into the chambers for expelling the contents of the testing chambers therefrom, a single light source remotely spaced from the testing chambers whereby the heat of the light source will not adversely affect the contents of the testing chambers, a plurality of fiber optic tubes, each of which is connected to the light source and one of the testing chambers for passing light through each of the testing chambers, and light measuring means for measuring the light passing through each of the testing chambers.

* * * * *